US011006573B2

(12) United States Patent
Desai

(10) Patent No.: US 11,006,573 B2
(45) Date of Patent: May 18, 2021

(54) CUTTER HOUSING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventor: Shivang Desai, Carrboro, NC (US)

(73) Assignee: HONDA MOTOR CO., LTD., Tokyo (JP)

(*) Notice: Subject to any disclaimer, the term of this patent is extended or adjusted under 35 U.S.C. 154(b) by 149 days.

(21) Appl. No.: 16/405,665

(22) Filed: May 7, 2019

(65) Prior Publication Data

US 2020/0352094 A1   Nov. 12, 2020

(51) Int. Cl.
| | |
|---|---|
| *A01D 34/71* | (2006.01) |
| *A01D 34/66* | (2006.01) |
| *A01D 42/00* | (2006.01) |
| *A01D 34/81* | (2006.01) |
| *A01D 34/00* | (2006.01) |
| *A01D 101/00* | (2006.01) |

(52) U.S. Cl.
CPC ........... *A01D 34/71* (2013.01); *A01D 34/005* (2013.01); *A01D 34/668* (2013.01); *A01D 34/81* (2013.01); *A01D 42/005* (2013.01); *A01D 2101/00* (2013.01)

(58) Field of Classification Search
CPC .... A01D 34/71; A01D 34/005; A01D 34/668; A01D 34/81; A01D 42/005; A01D 34/667
See application file for complete search history.

(56) References Cited

U.S. PATENT DOCUMENTS

| | | | | |
|---|---|---|---|---|
| 1,427,915 A | * | 9/1922 | Sellgren | B61D 19/002 160/201 |
| 4,055,935 A | * | 11/1977 | Malion | A01D 34/6812 56/10.3 |
| 4,126,173 A | * | 11/1978 | Theuerkauff | E06B 9/08 160/229.1 |
| 5,469,905 A | * | 11/1995 | McKinney | E06B 9/0638 160/183 |
| 6,609,358 B1 | | 8/2003 | Schmidt et al. | |
| 6,751,937 B2 | | 6/2004 | Kobayashi et al. | |
| 6,874,309 B1 | * | 4/2005 | Bellis, Jr. | A01D 42/005 56/320.2 |
| 7,093,415 B2 | | 8/2006 | Kallevig et al. | |
| 7,174,700 B2 | | 2/2007 | Chenevert et al. | |
| 7,204,073 B1 | | 4/2007 | Chenevert | |
| 7,360,352 B2 | | 4/2008 | Samejima et al. | |
| 7,597,130 B2 | * | 10/2009 | Ichimaru | B60R 7/04 160/218 |

(Continued)

FOREIGN PATENT DOCUMENTS

| | | | | |
|---|---|---|---|---|
| JP | 2000153920 A | * | 6/2000 | |
| WO | WO-2017014174 A1 | * | 1/2017 | A01D 34/68 |

*Primary Examiner* — Thomas B Will
*Assistant Examiner* — Madeline Ivy Runco
(74) *Attorney, Agent, or Firm* — Kenealy Vaidya LLP

(57) ABSTRACT

Various types of lawnmowers are disclosed that include at least one cutter housing having a chamber wall with a discharge opening therein. The mowers can include a rolling shutter formed of multiple steel sheets held together by pins. In discharge mode, the rolling shutter can be wrapped around a roller cylinder. In mulching mode the rolling shutter can extend to close off the discharge opening of the mower.

20 Claims, 9 Drawing Sheets

(56) References Cited

U.S. PATENT DOCUMENTS

| | | | |
|---|---|---|---|
| 7,665,286 B2 | 2/2010 | Butler et al. | |
| 7,722,320 B2 * | 5/2010 | Matsumoto | F04D 29/542 |
| | | | 415/191 |
| 8,011,414 B2 * | 9/2011 | Levy | E06B 9/34 |
| | | | 160/133 |
| 8,627,911 B2 * | 1/2014 | Tregnago | B60K 11/085 |
| | | | 180/68.1 |
| 9,313,948 B2 * | 4/2016 | Moriguchi | A01D 34/78 |
| 9,485,911 B2 | 11/2016 | Thorman et al. | |
| 9,629,307 B2 | 4/2017 | Gaeddert et al. | |
| 9,750,179 B2 | 9/2017 | Korthals et al. | |
| 10,273,745 B2 * | 4/2019 | Wong | E04B 1/941 |
| 2018/0184590 A1 * | 7/2018 | Takahashi | A01D 43/063 |

* cited by examiner

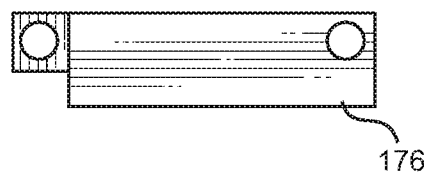
FIG. 7
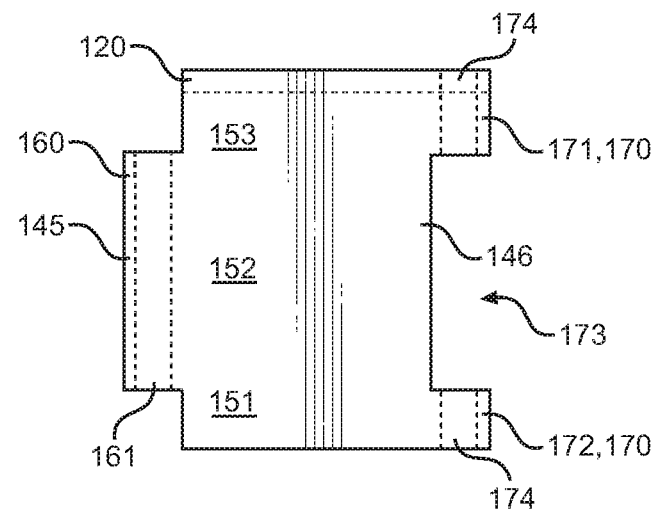
FIG. 8
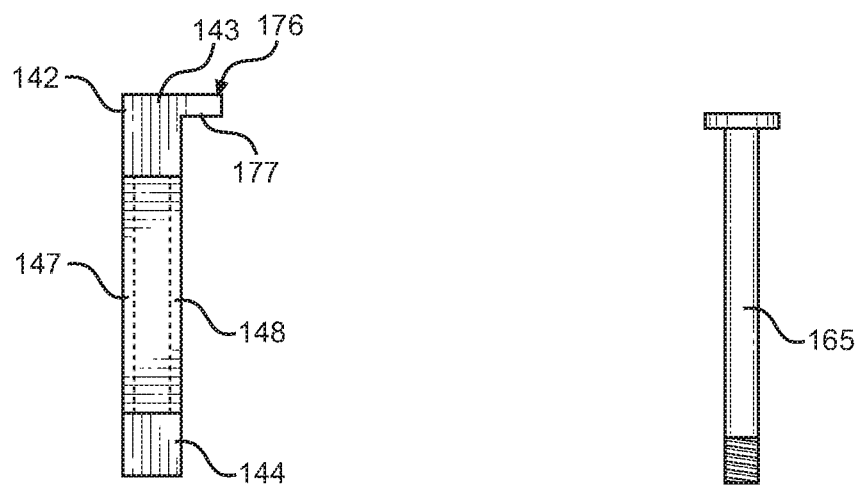
FIG. 9  FIG. 10

CUTTER HOUSING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, and walk-behind mowers. Some walk-behind mowers can include a prime mover mounted to the deck of the lawnmower. Mower decks associated with garden tractors, riding mowers and other walk-behind mowers can be removably attached to the frame of such self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching systems in which one or more movable components can be moved into any one of a plurality of positions between the mulching position and the discharging position such that some of the clippings are mulched and some of the clippings are directly discharged without mulching, via the discharge chute, into a collection bag or onto the ground.

SUMMARY

Some embodiments of the disclosed subject matter are directed to a cutter housing assembly for a lawnmower that includes a cutter housing having a chamber wall and a discharge opening.

According to an aspect of the disclosed subject matter, a cutter housing assembly for a lawnmower can include a cutter housing that includes a cutting chamber with a first discharge opening and a shutter fence that includes shutter slats. The shutter slats can be linked together to form the shutter fence, and the shutter fence can include an inner end and an outer end. A roller cylinder can be connected to the inner end of the shutter fence, and rotation of the roller cylinder can be controllable by a user to select between, (a) a discharge arrangement in which the shutter fence is wrapped upon the roller cylinder to provide a first gap associated with the first discharge opening, and (b) a mulch arrangement in which the shutter fence is unwrapped from the roller cylinder to provide a decreased gap, relative to the first gap, associated with the first discharge opening. A rotation actuator can be engaged with the roller cylinder and configured to rotate the roller cylinder. A guide assembly can be engageable with the shutter fence for slidably supporting the shutter fence in the mulch arrangement.

According to another aspect of the disclosed subject matter, a cutter housing assembly can include a cutter housing that includes a cutting chamber wall with a discharge opening and a shutter fence that includes a plurality of steel shutter slats. The shutter slats can be linked together to form the shutter fence. A roller cylinder can be connected to the shutter fence such that rotation of the roller cylinder moves the shutter fence between, (a) a discharge arrangement in which the shutter fence is wrapped upon the roller cylinder to provide a first gap associated with the discharge opening, and (b) a mulch arrangement in which the shutter fence is unwrapped from the roller cylinder to provide a decreased gap, relative to the first gap, associated with the discharge opening. An actuator assembly can be engaged with the roller cylinder and configured to rotate the roller cylinder upon actuation. A guide assembly can be configured to support the shutter fence during travel between the discharge arrangement and the mulch arrangement.

According to another aspect of the disclosed subject matter, a lawnmower can include a cutter housing that includes a cutting chamber wall with a discharge opening and a shutter fence that includes shutter slats, and pins connecting each of the shutter slats to each other to form the shutter fence. Each shutter slat can include, (a) a plate member that includes a top, a bottom, a first end, and a second end, (b) a first knuckle located at the first end and configured to engage an adjacent shutter slat of the shutter slats, (c) a second knuckle located at the second end configured to engage a further adjacent shutter slat of the shutter slats, and (d) a support slide flange. An actuator can be connected to the shutter fence and controllable by a user to selectively move the shutter fence between (a) a discharge arrangement in which the shutter fence is spaced from the discharge opening to form a first gap through which lawnmower cuttings pass during operation of the lawnmower, and (b) a mulch arrangement in which the shutter fence blocks the discharge opening such that lawnmower cuttings are mulched during operation of the lawnmower. A guide assembly can be configured to engage the support slide flange to slidably support the shutter fence during travel between the discharge arrangement and mulch arrangement.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 7 is a top view of a shutter slat with support slide flange, in accordance with principles of the disclosed subject matter.

FIG. 8 is a side view of the shutter slat of FIG. 7.

FIG. 9 is an end view of a shutter slat with support slide flange of FIG. 7.

FIG. 10 is a side view of a pin, for connecting shutter slats, in accordance with principles of the disclosed subject matter.

DETAILED DESCRIPTION OF EXEMPLARY EMBODIMENTS

Figure 1:
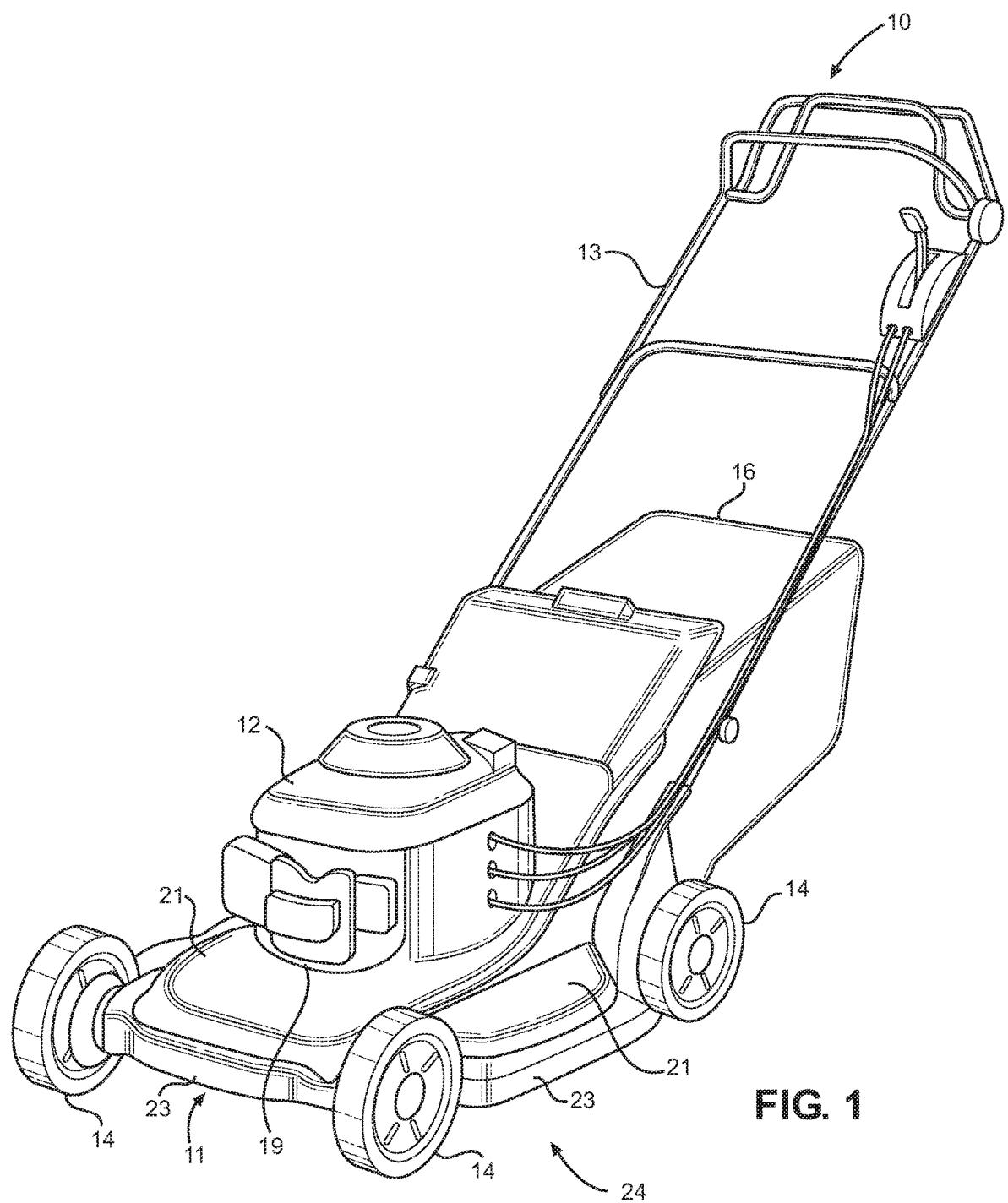
FIG. 1 is a perspective view of an embodiment of a lawnmower made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies are known that convert a lawnmower between a discharge mode and a mulch mode. Some mulching assemblies remain mounted in the cutter housing of the lawnmower and require many components, including different doors, levers, and rotating gears that facilitate conversion from a full mulching mode to a discharge mode. However, these many components can result in a labor-intensive assembly for manufacturing and/or for operation and maintenance. Thus, the manufacturing and operating cost for lawnmowers with automatic cutting/mulching conversion devices can be greater as compared to a lawnmower that includes a removable mulching conversion assembly. However, removal and installation processes for removable mulching conversion assemblies are typically inconvenient and time consuming. Thus, there is a need for an automatic mulching conversion assembly that can reduce manufacturing and operation cost and lessen or avoid any inconvenience perceived by the operator when converting the lawnmower between the discharge mode and the mulching mode.

In accordance with aspects of the disclosure, an assembly is provided with a shutter fence or fences that can be manipulated to convert a lawnmower from a discharge mode to a mulching mode. The shutter fence can be configured to obstruct or close a discharge opening (or openings) in the cutter housing(s). The user can remotely actuate the shutter fence to move between the mulching mode position and the discharge mode position or interim positions therebetween. The shutter fence can be used with a lawnmower or cutter housing that includes one blade, or more than one blade. The shutter fence can be implemented in a walk-behind lawnmower, in a cutter housing of a riding mower, in a cutter housing of a garden tractor, or other known mower systems.

The disclosed assembly can allow the user to change the cutting mode from all mulching to side discharge (and interim partial mulch modes therebetween) without the need for installing extra parts and in a smooth and simple operation requiring few parts. Conversion can also be accomplished without interrupting the cutting operation of the lawnmower.

The disclosed assembly can include a rolling shutter door made up of multiple slats or sheets, i.e. shutter slats, which can be constructed of steel, for example. The multiple slats or sheets can be connected together, in series, utilizing pins. In discharge mode, the rolling shutter door can be wrapped upon a roller cylinder, which is fixed below the cutter deck surface. The rolling shutter door and the roller cylinder can be housed in a steel housing. Each roller cylinder can be supported and/or driven by a spindle shaft. The spindle shaft can be driven by an electric motor with gear arrangement, can be operated manually such as by a turn crank, can be operated hydraulically such as through a piston arrangement, and/or can be operated by other mechanical, electrical, magnetic or pneumatic arrangement.

The disclosed assembly can include a regulator or controller that controls the electric motor, which rotates the roller cylinder. A user can operate the regulator to switch from full discharge, partial discharge/mulch, or to full mulch mode. In the mulching mode, the rolling shutter door unwraps from the cylinder and rolls or slides upon and/or is supported by a guide rail or guide slot. The guide slot can be covered or associated with a plate, which is positioned over or associated with a respective guide slot. The guide rail or guide slot can be provided in the deck of a cutter housing. In full mulch mode, the rolling shutter door be totally spooled off of the roller cylinder and extend along the guide rail to close up or close the space between multiple blades in the cutter housing.

Figure 2:
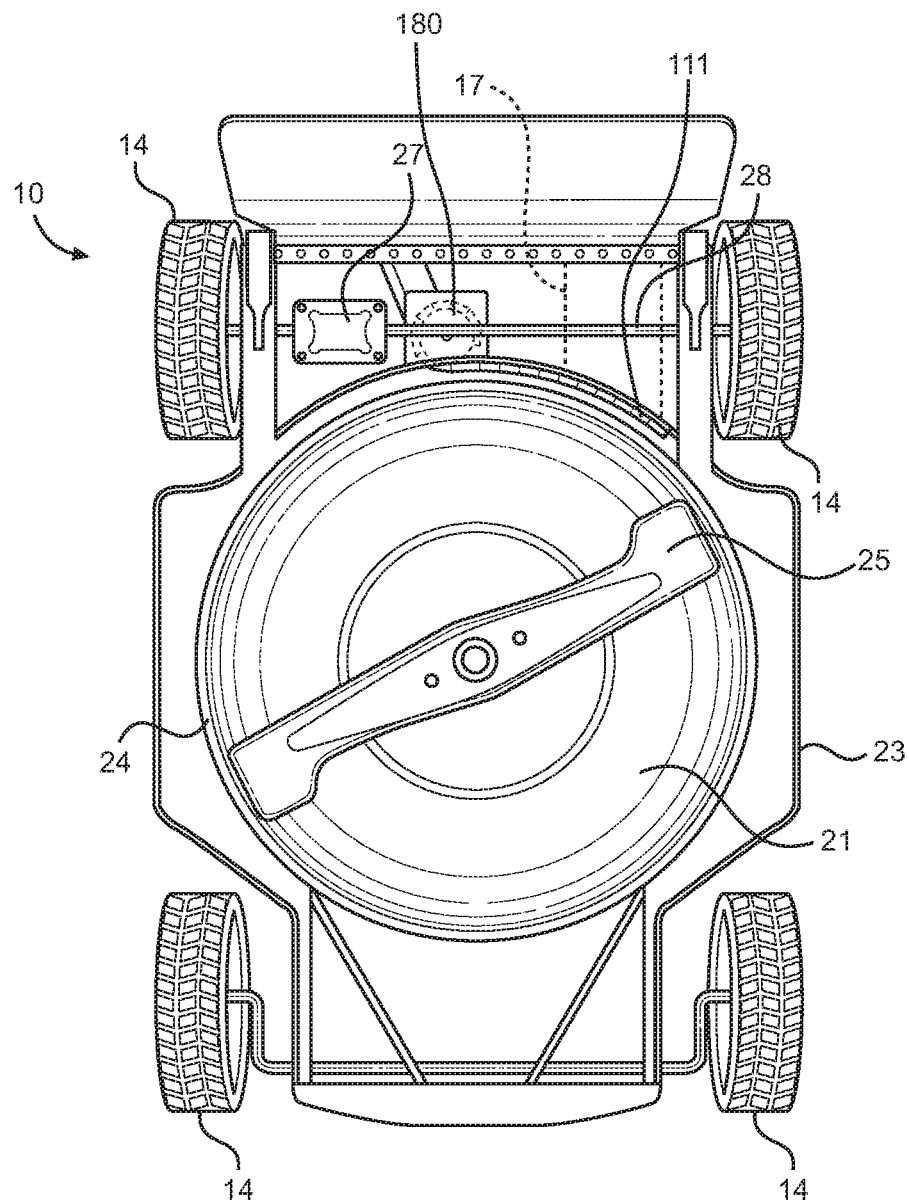
FIG. 2 is a bottom view of the lawnmower, with cutter housing, as shown in FIG. 1.

FIG. 1 is a perspective view of an exemplary lawnmower 10, and specifically a walk-behind lawnmower. FIG. 2 is a bottom view of the lawnmower of FIG. 1. The lawnmower 10 can include a cutter housing assembly that includes a cutter housing 11, a shutter assembly described below with respect to an exemplary embodiment illustrated in FIGS. 5-14, and at least one blade 25 rotatably supported by the cutter housing 11. The cutter housing 11 can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. Referring to FIG. 2, the prime mover 12 can drive a driveshaft that supports at least one blade 25. The blade 25 can rotate in a cutting chamber 24 defined by the cutter housing 11 and opened toward the ground. In operation of the lawnmower, the prime mover 12 rotates the driveshaft, which, in turn, rotates the blade 25. As a result, the lawnmower 10 can perform a mowing operation on vegetation, such as to mow a lawn.

As shown in FIG. 1, the lawnmower 10 can include a steering handle 13 and a plurality of wheels 14. The steering handle 13 can be used by a user to operate the lawnmower 10 and guide the path of travel of the lawnmower 10. The steering handle 13 can include or be associated with various control mechanisms, such as speed controls for self-propelled lawnmowers, safety stop levers or bars, which the user must depress or hold to maintain the lawnmower in a running state, etc. In a self-propelled lawnmower, the wheels 14 at the rear of the lawnmower 10 can be driven so as to propel the lawnmower 10.

The lawnmower 10 can also include a discharge chute 17 and the lawnmower 10 can include a collection bag 16. The discharge chute 17 can be located at the rear of the cutter housing 11 and adjacent to the wheel 14 at the right rear of the cutter housing 11, for example. The discharge chute 17 can be in communication with the cutting chamber 24 and oriented to discharge the vegetation clippings toward the side of the lawnmower 10 or toward the rear of the lawnmower 10. In the exemplary embodiment of FIG. 1, the discharge chute can discharge the clippings toward the rear of the lawnmower 10. When the lawnmower 10 is in a discharging mode, lawn clippings, for example, can be propelled from the cutting chamber 24, in which blade 25 spins and in which vegetation is cut by the spinning blade of the lawnmower 10 into the discharge opening and through a discharge chute. The clippings can pass through the discharge chute 17 and into the collection bag 16. Alternatively, the collection bag 16 can be removed from the lawnmower 10, and the lawnmower 10 can discharge the clippings through the discharge chute and onto the ground. Additionally, the lawnmower 10 can include a gearbox 27 that drives rear axle 28. The gearbox 27 can be mechanically and operatively connected to the prime mover 12 so as to provide power to the rear axle 28.

As shown in FIG. 1 and FIG. 2, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can also be integrally formed with the sidewall(s) 23. For example, the top wall 21 and the sidewall(s) 23 can be integrally formed of stamped or cast metal or of molded plastic construction. In the exemplary embodiment of FIG. 1, the cutter housing 11 can be stamped from a steel sheet. A shutter fence 111 can be spooled about a roller cylinder 180 for storage in the discharge mode, and can extend along guide slot 191 to cover the discharge chute 17 in mulch mode.

Figure 3:
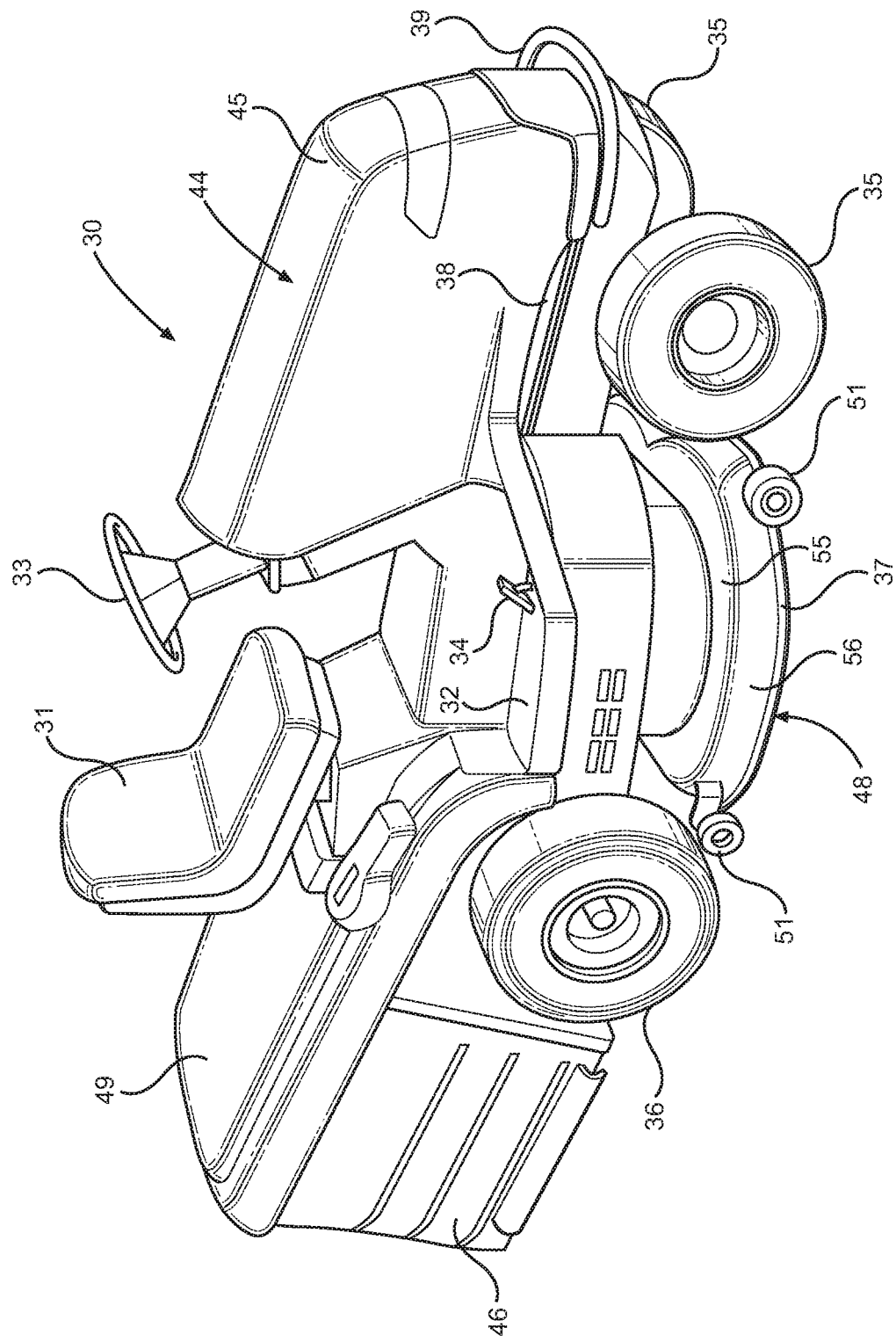
FIG. 3 is a perspective view of another embodiment of a lawnmower made in accordance with principles of the disclosed subject matter.

FIG. 3 is a perspective view of another embodiment of a lawnmower 30 in the form of a riding lawnmower or a garden tractor. The lawnmower 30 can support a human operator who rides on the lawnmower 30. The operator can be supported by a seat 31 and one or more foot supports 32 of the lawnmower.

The operator can control movement of the lawnmower 30 on a lawn, terrain, or other surface using a steering wheel 33, one or more control pedals 34, and/or other control mechanisms. The control pedals 34 can be provided on or adjacent to the foot supports 32 of the lawnmower 30. For example, a control pedal 34 can be configured as an accelerator to provide control of travel speed of the lawnmower 30 and can also be associated with a clutch and transmission to control forward/reverse direction and speed ranges for the lawnmower 30.

The lawnmower 30 can include a cutter housing assembly that includes a cutter housing 37, a shutter assembly described below with respect to an exemplary embodiments illustrated in FIGS. 5-14, and a pair of blades 40, 41 rotatably supported by the cutter housing 37. The cutter housing 37 can also be referred to as a deck or as a mower deck or as a cutter deck of the lawnmower 30. The cutter housing 37 can be removably mounted to a frame of the lawnmower 30. In the exemplary embodiment of FIG. 4, the cutter housing 37 can support the pair of blades 40, 41. However, alternate embodiments of the cutter housing 37 can include any appropriate or desired number of blades. For example, FIG. 5 shows an alternate embodiment of a cutter housing 58 for use with the lawnmower 30 that supports three blades 68, 69, 70.

Figure 4:
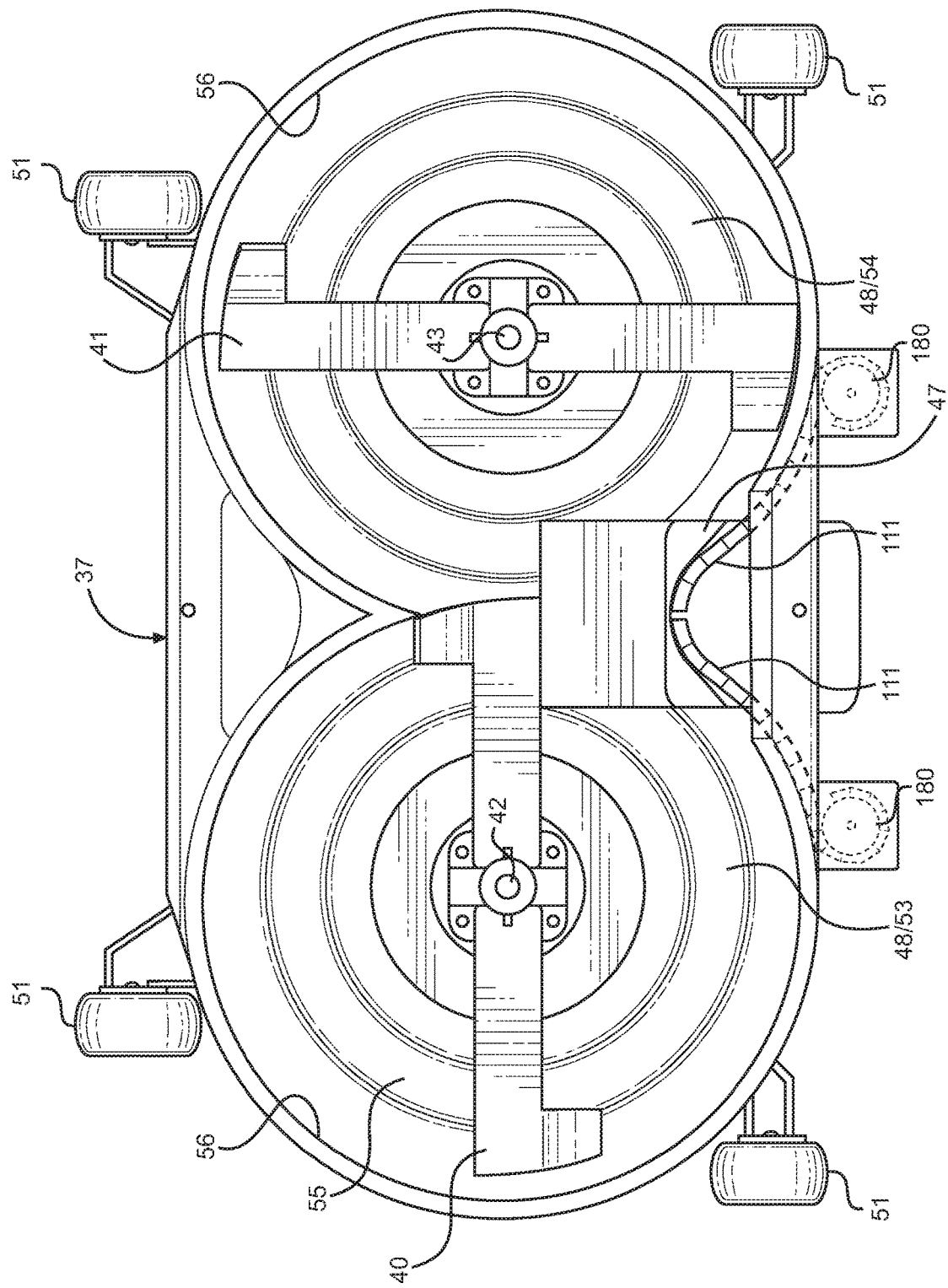
FIG. 4 is a bottom view of the lawnmower, with cutter housing with two blades, as shown in FIG. 3.
Figure 5:
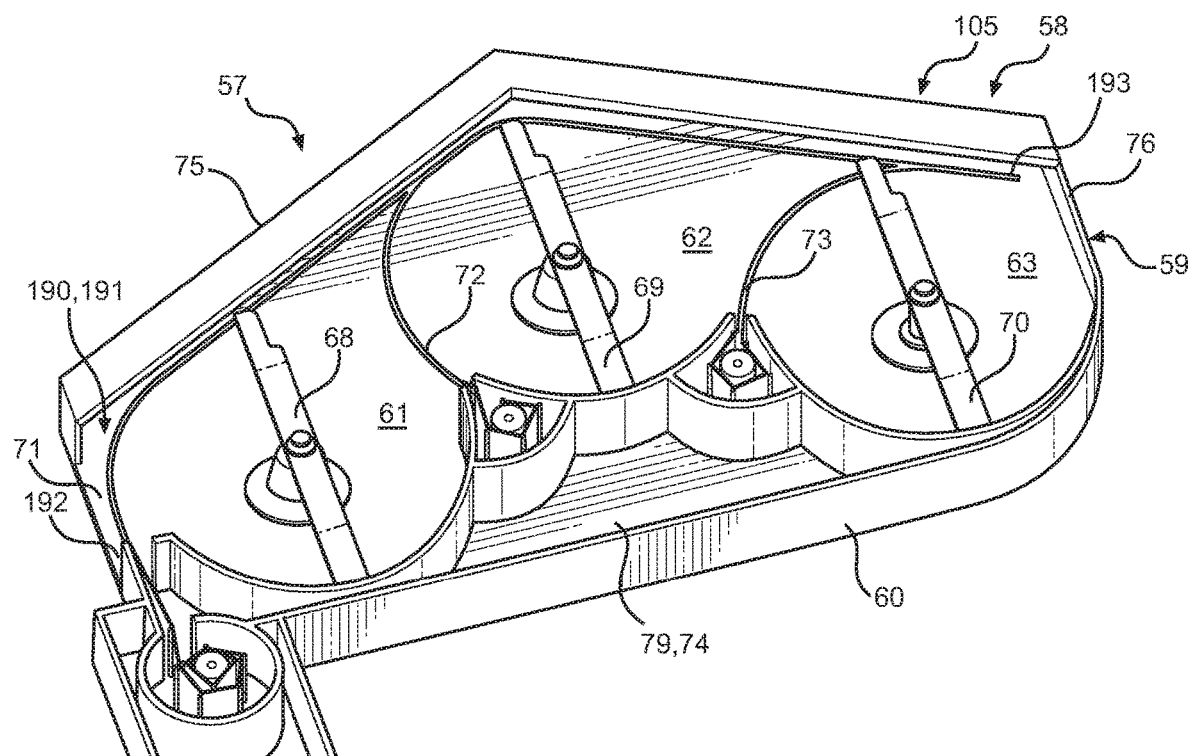
FIG. 5 is a bottom view of an embodiment of a cutter housing, in discharge mode, with three blades made in accordance with principles of the disclosed subject matter.

Referring to FIG. 4, the blades 40, 41 can rotate in a cutting chamber 48 defined by the cutter housing 37 and opened toward the ground. In operation of the lawnmower 30, the prime mover 38 can rotate a driveshaft that can be mechanically connected to the one or more blades 40, 41, such as by first driven shaft 42 and second driven shaft 43, so as to rotate the one or more blades. As a result, the lawnmower 30 can perform a mowing operation on vegetation, which can include or be in the form of a lawn.

Referring to FIGS. 3 and 4, the prime mover 38 can be in the form of a gasoline engine or an electric motor. The prime mover 38 can also supply power for driving the one or more wheels 35, 36 of the lawnmower, as controlled by the operator.

Any appropriate power transmission mechanism can transfer power from the prime mover 38 to the driven wheel(s) such as but not limited to a fluid pump and hydrostatic motor system or a multiple ratio gear transmission system. The gear transmission system can be connected to the prime mover by one or more driveshaft(s), or by a belt and pulley system.

The lawnmower 30 can include a frame or chassis 39. The frame 39 can provide a main supporting structure of the lawnmower 30 to which various components of the lawnmower 30 are attached.

The frame 39 of the lawnmower 30 can also support a body 44 of the lawnmower 30. The body 44 can provide an outer, finished surface that can cover the frame 39, prime mover 38, and other components or portions of components of the lawnmower 30. The body 44 can include an engine hood 45 that covers at least a portion of the prime mover 38. The foot support(s) 32, as described above, can be integrally formed and/or supported by the body 44 of the lawnmower 30.

The lawnmower 30 can also include a collection bag 46. The collection bag 46 can be supported by the frame 39 of the lawnmower. A discharge opening and/or passageway 47 can be provided to transfer clippings from a cutting chamber 48 to the collection bag 46 when the lawnmower 30 is in a discharge mode. The body 44 of the lawnmower 30 can include a collection bag cover 49 that is positioned over and/or covers the collection bag 46.

The lawnmower 30 can include a cutter housing lift assembly that controls height of the cutter housing 37 relative to the ground and/or frame 39. The cutter housing 37 can be provided with housing wheels or housing rollers 51. The housing rollers 51 can limit how close the cutter housing 37 or particular portion of the cutter housing 37 gets into the lawn.

FIG. 4 is a bottom view of a cutter housing 37 shown in FIG. 3. The cutting chamber 48 can include a first cutting chamber 53 and a second cutting chamber 54. In other arrangements, additional cutting chambers can be provided. The first cutting chamber 53 houses a first blade 40. The second cutting chamber 54 houses a second blade 41. The first blade 40 and the second blade 41 can be driven, so as to cut grass or other vegetation, as described above.

The lawnmower of FIG. 4 has a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a timing belt or a shaft and gear drive or other similar arrangement that limits or prevents rotation of one the blades 40, 41 relative to the other of the blades 40, 41. In the illustrated synchronous cutter housing layout, the cutting circle in which the first blade 40 rotates can intersect the cutting circle in which the second blade 41 rotates such that first blade 40 enters the cutting circle of the second blade 41 and the second blade 41 enters the cutting circle of the first blade 41. Accordingly, it can be advantageous to synchronize rotation of the first blade 40 with rotation of the second blade 41 so that the two blades 40, 41 can avoid a collision or interference with each other. Such intersection of the cutting circles of the two blades 40, 41 can be desired so as to provide effective cutting coverage of the lawn. In other words, such intersection of the cutting circles of the two blades 40, 41 can be desirable so that cross-over of the blades 40, 41 is provided and vegetation between the centers of the two blades 40, 41 is cut.

The cutter housing 37 can include a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56. The top wall 55 and the sidewall(s) 56 can form at least portions of the first cutting chamber 53 and the second cutting chamber 54 shown in FIG. 4. For example, the top wall 55 and the sidewall(s) 56 can be integrally formed of stamped or cast metal or of molded plastic construction.

The cutter housing 37 shown in FIG. 4 can include a rear discharge layout. That is, a discharge opening 47 can be provided at the rear of the cutter housing 37. The discharge opening 47 can be in communication with each of the first and second cutting chambers 53, 54. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag 46. The collection bag 46 can then be emptied at a point in time as may be desired. It is appreciated that the size and particular positioning of the discharge opening 47 can be varied as may be desired. A shutter fence 111 can be spooled about a roller cylinder 180 for storage in the discharge mode, and can extend along guide slot 191 to cover the discharge opening 47 in mulch mode.

Figure 6:
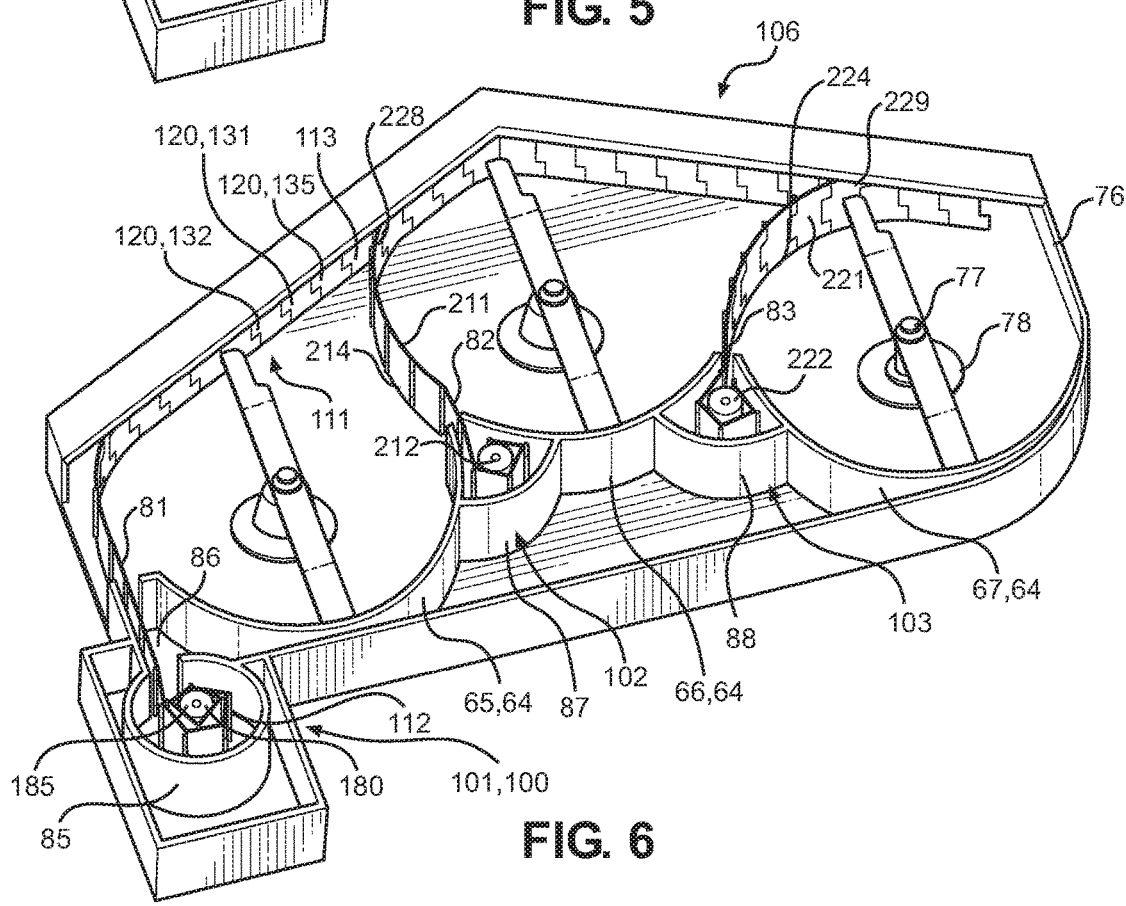
FIG. 6 is a bottom view of the embodiment of the cutter housing of FIG. 5, in mulch mode.

FIGS. 5 and 6 illustrate an embodiment of a cutter housing assembly 57 including a cutter housing 58, shutter assemblies 101, 102, 103 and a plurality of blades 68, 69, 70. The exemplary cutter housing assembly 57 is usable with the lawnmower 30 configured as either a riding mower or as a garden tractor, or usable with a walk-behind lawnmower. As will be described in further detail below, the exemplary shutter assembly 101, as well as shutter assemblies 102, 103, can respectively include a shutter fence 111, 211, 221 that can selectively obstruct or close respective discharge openings of the cutter housing 58 in order to convert the cutter housing 58 between the mulching mode and the discharge mode as well as locations therebetween (partial mulch mode). The shutter assemblies 101, 102, 103 can be configured for use with the cutter housing 11 of FIGS. 1 and 2 or the cutter housing 37 of FIGS. 3 and 4. The shutter assemblies 101, 102, 103 can collectively be characterized as a shutter system 100.

FIG. 5 is a bottom view of the cutter housing 58 and shows features of the cutter housing assembly 57. The cutter housing 58 can also be referred to as a deck or as a mower deck or as a cutter deck of the lawnmower 30. The cutter housing 58 can be removably mounted to a frame 39 of the lawnmower 30. The cutter housing 58 is shown as supporting three blades 68, 69, 70, but can include any appropriate number of blades as deemed appropriate for a particular application.

The cutter housing 58 can include a first cutting chamber 61, a second cutting chamber 62, and a third cutting chamber 63. The cutting chambers 61, 62, 63 can be demarcated or defined by side walls 59 and/or chamber walls 64. The sidewalls 59 can include a rear sidewall 60, a front sidewall 75, opposing side sidewalls 76 (on the sides of the cutter housing 58). The cutter housing 58 can including a top wall 74. The top wall 74 can include an underside 79. The chamber walls 64 can include a first chamber wall 65, a second chamber wall 66, and a third chamber wall 67. The first chamber wall 65 can serve to demarcate, at least in part, the first cutting chamber 61. The second chamber wall 66 can serve to demarcate, at least in part, the second cutting chamber 62. The third chamber wall 67 can serve to demarcate, at least in part, the third cutting chamber 63.

Figure 11:
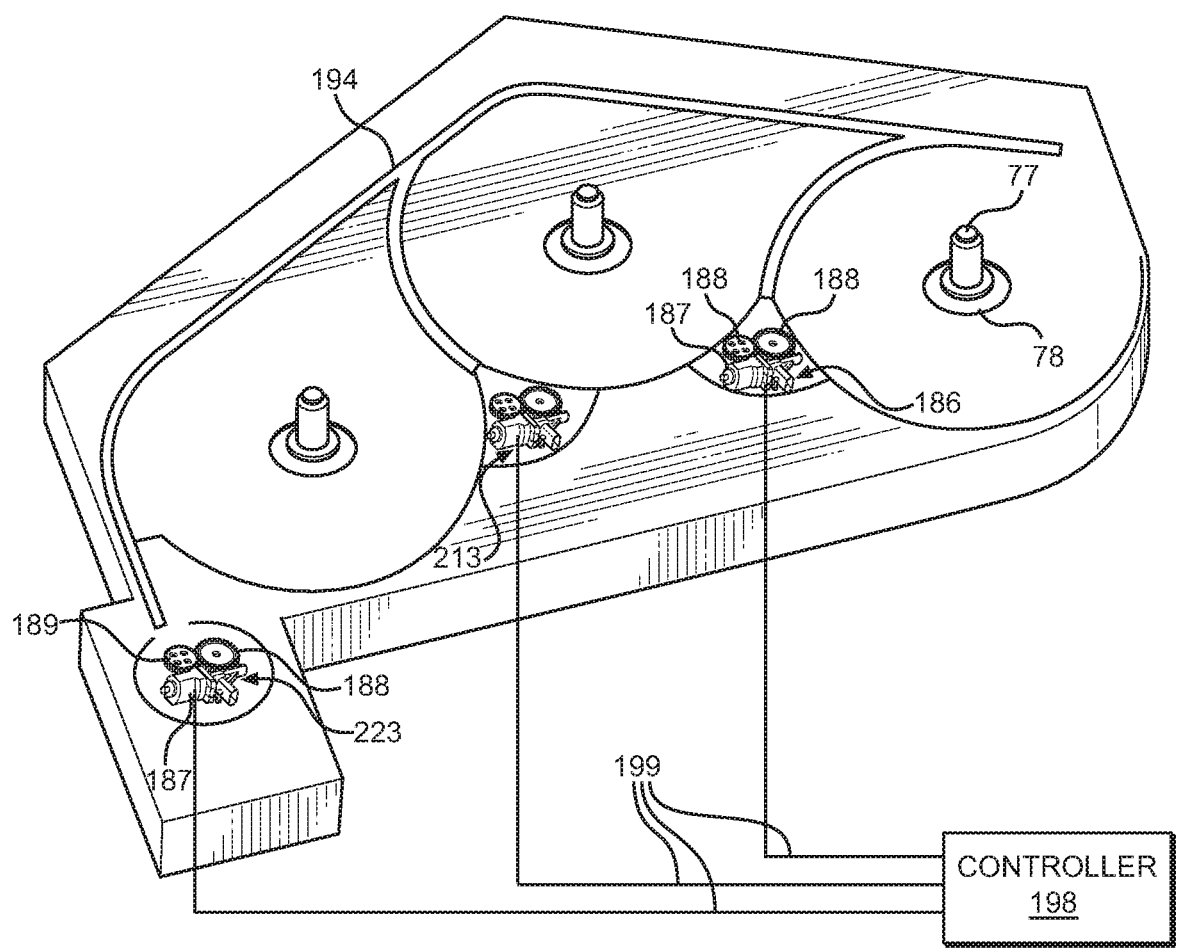
FIG. 11 is a top perspective view of the cutter housing of FIG. 5.

Each of the cutting chambers 61, 62, 63 can be provided with a respective rotating blade 68, 69, and 70. The rotating blades can include a first blade 68, a second blade 69, and a third blade 70. Referring to FIG. 11, each of the rotating blades 68, 69, 70 can be mounted on and driven by a respective driven shaft 77 with associated pulley. The driven shaft 77 can be pivotably supported by a bearing assembly 78 in the top wall 74 of the cutter housing 58. Each of the driven shafts 77 can be mechanically powered by the prime mover 38 of the lawnmower 30, in conjunction with a mechanical power transfer arrangement, such as but not limited to the pulley and belt system described above.

The cutter housing 58 of FIG. 5 is provided, as illustrated, with a side discharge layout. The side discharge layout can include a discharge opening 71 on the left-hand side as shown in FIG. 5, i.e., with the cutter housing upside down. The cutter housing 58 can include a second discharge opening 72 of the second cutting chamber 62. The cutter housing 58 can include a third discharge opening 73 of the third cutting chamber 62. However, the cutter housing 58 can be configured as a rear discharge cutter housing such as the exemplary cutter housing 11 of FIGS. 1 and 2, or the exemplary cutting housing 37 of FIGS. 3 and 4.

A shutter fence 111 can selectively obstruct or close the discharge opening 71 of the cutter housing 58 in order to convert the cutter housing 58 between the mulching mode and the discharge mode and points therebetween. FIG. 6 shows the shutter fence 111 in a mulch position in which the shutter fence 111 closes or obstructs the discharge opening 71 and places the cutter housing 58 in the mulching mode.

The first chamber wall 65 and the second chamber wall 66 can include a first common opening or second discharge opening 72. The second discharge opening 72 places the second cutting chamber 62 in communication with the first cutting chamber 61 (i.e., air and clippings can freely move between the first chamber and the second chamber). The second chamber wall 66 and the third chamber wall 67 can include a second common opening or third discharge opening 73. The third discharge opening 73 places the third cutting chamber 63 in communication with the second cutting chamber 62. As a result, lawn clippings can be propelled, due to the airflow within the cutter housing 58, along the front of the chamber walls 65, 66, 67 and towards the discharge opening 71 where the lawn clippings can exit the discharge opening 71 and thereby exit the cutter housing 58, when the shutter fence 111 does not obstruct or close the discharge opening 71.

The cutter housing 58 of FIG. 5 illustrates an asynchronous cutter housing layout of a mower deck. In such arrangement, the center blade 69 can be positioned, in a longitudinal direction of the lawnmower 30, in front of both of the outboard blades 68, 70. Thus, in the arrangement there may be a path of the cutting circle of the center blade 69 that overlaps the path of the cutting circle for each of the outboard blades 68, 70 as the lawnmower 30 traverses the lawn or terrain. However, because the center blade 69 is positioned in front of the outboard blades 68, 70 the blades do not interfere with each other in rotation. Accordingly, in such an arrangement, synchronizing the rotation of the blades 68, 69, 70 relative to each other can be avoided, thereby simplifying the blade drive assembly in some respects as compared to the exemplary cutter housing 37 of FIGS. 3 and 4.

As described above, the disclosed lawnmowers can include a cutter housing lift assembly that controls height of the cutter housing relative to the ground or terrain that is traversed.

As shown in FIGS. 5 and 6, the cutter housing assembly 57 can include cutter housing 58. The cutter housing assembly can also include the shutter assembly 101, the second shutter assembly 102, and the third shutter assembly 103. The shutter assembly 101 can be similar in structure and function to the second shutter assembly 102 and the third shutter assembly 103.

The shutter assembly 101 can include the shutter fence 111, a roller cylinder 180, a rotation actuator assembly 186, and a guide assembly 190. The shutter assembly 101 can also include a pull assembly 200.

The shutter fence 111 can include a plurality of shutter slats 120. The shutter slats 120 can be linked or connected together in sequence so as to form the shutter fence 111. The shutter fence 111 can include an inner end 112 and an outer end 113. The inner end 112 can be attached or connected to a roller cylinder 180. The roller cylinder 180 can be mechanized so as to be rotatable. Rotation of the roller cylinder 180 can be controllable by a user or operator. Rotation of the roller cylinder 180 can selectively provide a discharge arrangement 105, shown in FIG. 5, and a mulch arrangement 106, shown in FIG. 6, as well as partial mulch arrangements at positions therebetween. In the discharge arrangement 105, the shutter fence 111 can be wrapped upon the roller cylinder 180 to provide a first gap associated with the first discharge opening 71. That is, the shutter fence 111 can be fully wrapped upon the roller cylinder 180 to result in the first gap being at its greatest, i.e., with the first discharge opening 71 fully opened. In the mulch arrangement 106, the shutter fence 111 can be unwrapped from the roller cylinder 180 so as to provide a decreased gap, relative to the first gap, associated with the first discharge opening. Accordingly, variable mulching can be provided. For example, in the mulch arrangement 106, the shutter fence 111 can fully cover or close the first discharge opening 71 so as to provide full mulching.

The rotation actuator assembly 186 can be mechanically and operatively attached to the roller cylinder 180 so as to provide rotation of the roller cylinder 180. For example, the rotation actuator assembly 186 can be a motor and gear assembly as described further below.

As the shutter fence 111 is unwrapped and/or pulled from the roller cylinder 180, more and more of the shutter fence 111 can extend upon and be supported by a guide assembly 190, which can including one or more slats. In particular, the guide assembly 190 can engage with the shutter fence 111 for supporting the shutter fence 111 in the mulch arrangement. The guide assembly 190 can support an outer end 113 of the shutter fence 111, as well as sequentially connected shutter slats 120 that extend across the first discharge opening 71. Further details of the various components of the shutter assembly 101 will be described in turn below.

A plurality of shutter slats 120 can be connected or linked together so as to form the shutter fence 111. Each of the shutter slats 120 that make up the shutter fence 111 can be of similar or same structure or construct as shown in FIGS. 7-10, for example. While each of the shutter slats 120 can be of the same construct, the shutter slats 120 can be characterized by each shutter slat's respective position or sequence in the shutter fence 111 and/or by a respective function of each particular shutter slat 120. Accordingly, the shutter fence 111 can be characterized as including an attachment shutter slat 121, an end shutter slat 125, and a plurality of extension shutter slats 130.

The attachment shutter slat 121 can be provided at the inner end 112 of the shutter fence 111 and can constitute the inner end 112. The attachment shutter slat 121 can be attached to a roller cylinder connector 181. In turn, the roller cylinder connector 181 can be attached to the roller cylinder 180. Alternatively, the roller cylinder connector 181 can be integrally formed with the roller cylinder 180 or in other manner part of the roller cylinder 180. For example, the roller cylinder connector 181 might be a chain-link or carabiner type connection that connects the attachment shutter slat 121 to the roller cylinder 180.

The end shutter slat 125 can be provided at or constitute the outer end 113 of the shutter fence 111. The end shutter slat 125 can be attached to a pull assembly 200. The pull assembly 200 can include a cable, a pull actuator, or a pull rod, for example. The pull assembly 200 can be provided to operatively pull the shutter fence 111 so as to unwrap the shutter fence 111 from the roller cylinder 180. Further details regarding the pull assembly 200 are described below.

Accordingly, the attachment shutter slat 121 can be provided at the inner end 112 of the shutter fence 111 that is adjacent or at the roller cylinder 180. The end shutter slat 125 can be provided at the outer end 113 of the shutter fence 111 that is farthest from the roller cylinder 180. A variable number of extension shutter slats 130 can be provided between the end shutter slat 125 and the attachment shutter slat 121. As more extension shutter slats 130 are added to the shutter fence 111, the length of the shutter fence 111 can be increased. Accordingly, for a lawnmower with a large discharge opening, more extension shutter slats 130 can be utilized as compared to a lawnmower with a smaller discharge opening. The shutter slats 120 can be constructed so as to be rotatable relative to each other. As a result, the shutter slats 120, and in particular the extension shutter slats 130, can be wrapped around the roller cylinder 180. Further, the shutter fence 111 can be disposed or provided in a curved shape as dependent on the curvature of the guide assembly 190.

With reference to FIGS. 7-13, each shutter slat 120 can include a plate member 140. The plate member 140 can include a top 142 and a bottom 144. The plate member 140 can include a first end or inner end 145, at an end of the plate member nearer to the roller cylinder 180, and a second end or outer end 146, at an end of the plate member away from the roller cylinder 180. The top 142 can include a top edge 143. A support slide flange 176 can be attached to the top edge 143 and can extend horizontally from the top edge 143 in one or both directions, so as to be perpendicular to the plate member 140. The support slide flange 176 can run along a length, or portion(s) thereof, of the plate member 140 from the first end 145 to the second end 146. Additionally, the plate member 140 can include a first side 147, facing the first discharge opening 71 and a second side 148 that opposes the first side.

The support slide flange 176 can slidably support each of the shutter slats 120 in the guide assembly 190, for example, in slot 191, slot 214, and/or slot 224. The support slide flange 176 can include a lower slide surface 177 that can slide along the top wall 74 of the cutter housing 58. The top 142 of each shutter slat 120 can extend through the top wall 74 of the cutter housing 58 such that the support slide flange 176 is positioned above the top wall 74. The plate member 140, excepting a part that extends through the top wall 74 (and connects to the support slide flange 176) can be positioned below the top wall 74.

Each of the shutter slats 120, including each extension shutter slat 130, can include a hinge or attachment mechanism so as to attach, on both ends, to a respective adjacent shutter slat 120. Such attachment mechanism can include interleaving portions of adjacent shutter slats 120, with such interleaved portions being connected utilizing a pin or connection pin, or some other connecting structure. More specifically, the first end 145 of the plate member 140 can be provided with a first knuckle 160. The second end 146 can be provided with a second knuckle 170. The first knuckle 160 can be integrally formed and/or a part of the first end 145. The second knuckle 170 can be integrally formed with and/or a part of the second end 146.

The first knuckle 160 can include or be constituted by a middle knuckle meaning that the middle knuckle can extend from the first end 145 at a central height portion 152 of the plate member 140. The central height portion 152 can be at an interim vertical height between the top 142 of the plate member 140 and the bottom 144 of the plate member 140. The middle knuckle 160 can attach to an adjacent shutter slat 131. Another adjacent shutter slat (moving toward the roller cylinder 180) can be denoted as adjacent shutter slat 132. A further adjacent shutter slat (moving toward the end shutter slat 125) can be denoted as a further adjacent shutter slat 135. The shutter slats 131, 132, 135 can all be of same or similar construct.

The middle knuckle 160, of the shutter slat 131, can provide a connection to the adjacent shutter slat 132. The middle knuckle 160 can be characterized as a first knuckle. The middle knuckle 160, of the shutter slat 131, can include a bore 161. A connection pin 165 can extend through the bore 161 so as to connect the shutter slat 131 to the adjacent shutter slat 132. The connection pin 165 can include or be associated with a lock nut 166 or other mechanical fastener provided to retain the connection pin 165 in position. The connection pin 165 can be characterized as being a part of shutter slat 131 or as being a part of the adjacent shutter slat 132. Accordingly, the connection pin 165 can be characterized as being a separate mechanical component of the shutter fence 111 as relative to the shutter slats 120. In lieu of a lock nut, the pin might be flared, crimped, include a hole with cotter key, or other fastener so as to position the pin at a desired relative position.

The shutter slat 131 can also include a second knuckle 170. The second knuckle 170, of the shutter slat 131, can provide a connection to the further adjacent shutter slat 135. The second knuckle 170 can include a top knuckle portion 171 and a bottom knuckle portion 172. The top knuckle portion 171 can extend horizontally from an upper height portion 153 of the second end 146 of the plate member 140 (of the shutter slat 131). The bottom knuckle portion 172 can extend horizontally from a lower height portion 151 of the second end 146 of the plate member 140 (of the shutter slat 131). The second knuckle 170 can include a bore 174 for receiving the connection pin 165 for attachment to the further adjacent shutter slat 135. The bore 174 can include an upper bore portion in the top knuckle portion 171 and a lower bore portion in the bottom knuckle portion 172. Accordingly, for example, a connection pin 165 can pass through the top knuckle portion 171 (of the shutter slat 131), the middle knuckle 160 (of the further adjacent shutter slat 135), and lastly through the bottom knuckle portion 172 (of the shutter slat 131). Relatedly, the shutter slat 131 can include a gap 173 between the top knuckle portion 171 and the bottom knuckle portion 172. The middle knuckle 160, of the further adjacent shutter slat 135, can be received into such gap 173.

Figure 12:
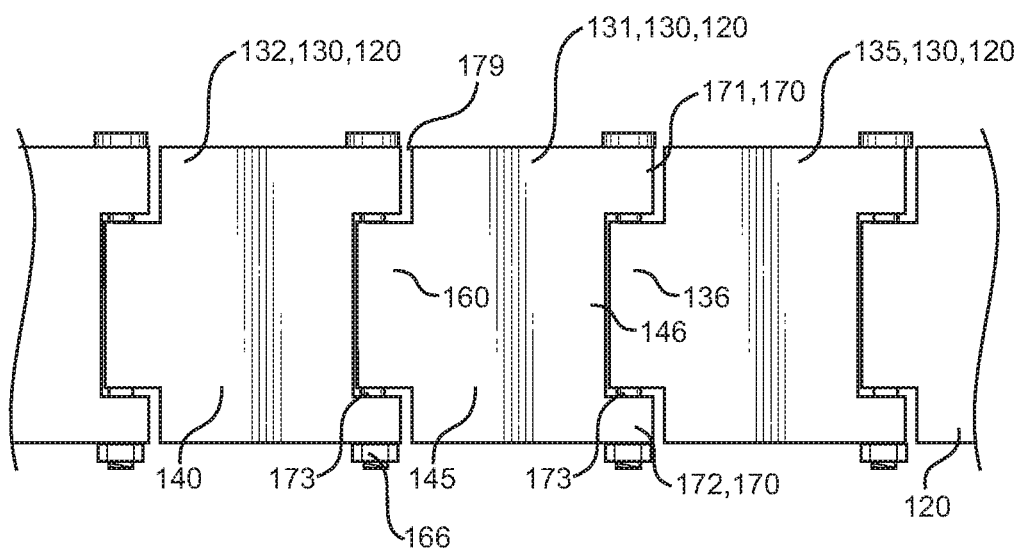
FIG. 12 is a schematic side view of a portion of a shutter fence, with shutter slats, in accordance with principles of the disclosed subject matter.

As shown in FIG. 12, spaces, openings or gaps 179 can be provided between the various shutter slats 120. Such gaps 179 can be provided to allow bending of the shutter fence 111 about a vertical axis. The gaps 179 can be gaps between the shutter slats 120 in both the vertical direction and the horizontal direction. For example, the gaps 179 can allow the shutter fence 111 to be bent or curved with the curvature of the guide assembly slot 191. As the size of the gaps 179 are increased in size, then the flexibility or looseness of the shutter fence 111 can be increased. However, as size of the gaps 179 increase, such can result in clippings or other yard debris being able to pass through the gaps 179. This may be counter to desired mulching operation. Additionally, as the gaps 179 are increased in size, such may impact desired airflow within the particular cutting chamber 61. Accordingly, the particular size and dimension of gaps 179 between the shutter slats 120 should be selected for a particular application in view of the above considerations.

As described above, adjacent shutter slats 120 can be attached together utilizing pins 165. Alternatively, other connection mechanisms may be used in lieu of a pin. For example, the middle knuckle 136 (in the further adjacent shutter slat 135) can be provided on both the top and bottom with an out-dent or protuberance, which engages or snaps into in-dents or recesses, respectively, in the top knuckle portion 171 and the bottom knuckle portion 172, or the reverse can be provided.

Figure 13:
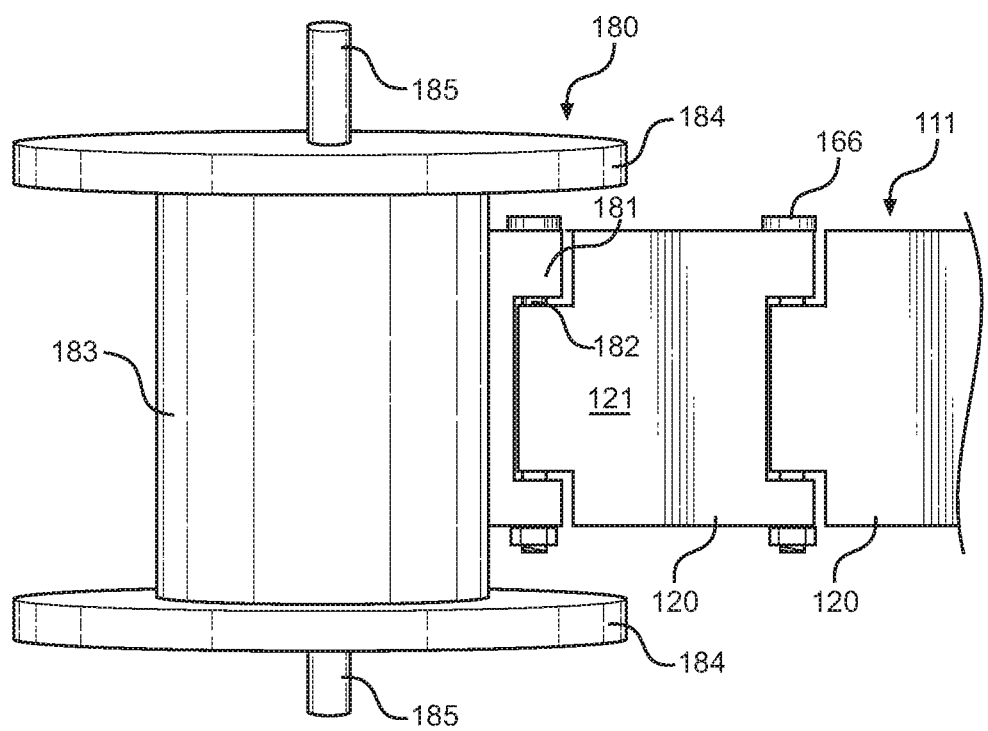
FIG. 13 is a schematic perspective view of the roller cylinder with portion of shutter fence of FIG. 5.

As described above, the shutter fence 111 can be wrapped or coiled around the roller cylinder 180, as shown in FIG. 5. As more of the shutter fence 111 is unwrapped from the roller cylinder 180, as a result of rotation of the roller cylinder 180, such can result in more of the shutter fence 111 covering the first discharge opening 71 to provide a mulch mode. As more of the shutter fence 111 is wrapped upon the roller cylinder 180, as a result of rotation of the roller cylinder 180, such can result in less of the shutter fence 111 covering the first discharge opening 71. As a result, the discharge mode or discharge arrangement 105 can be provided. FIG. 13 is a schematic perspective view of roller cylinder 180 with shutter fence 111. In the operational state shown in FIG. 13, the shutter fence 111 is fully unwrapped, unwound, unrolled, unreeled, or uncoiled from the drum flange 184. Such operational state is provided to show the connection between the shutter fence 111 and the roller cylinder 180. A roller cylinder connector 181, which can include or be associated with pin 182, can be utilized so as to connect shutter slat 120 to the roller cylinder 180. The roller cylinder connector 180 can include similar structure to the second knuckle 170 as described above, or can be of similar structure to the first knuckle 160, i.e., in an arrangement where the shutter slats 120 are flipped or reversed. With such flipped or reversed arrangement, the second knuckle 170, of each shutter slat 120, are positioned to be closer to the roller cylinder 180 than the first knuckle 160. That is, it is appreciated that the orientation of each of the shutter slats 120 can be flipped or reversed 180 degrees from the arrangement shown in FIG. 6 and shown in FIG. 13.

The roller cylinder 180 can be driven or rotated by driveshaft 185. The driveshaft 185 can be rotated by rotation actuator assembly 186. From the operational state shown in FIG. 13, the roller cylinder 180 might be rotated clockwise or counterclockwise so as to initiate wrapping of the shutter fence 111 upon the roller cylinder 180. However, the position of the roller cylinder 180 upon the cutter housing 58, as well as the direction upon which the shutter fence 111 is wrapped upon the roller cylinder 180, can be provided so as to afford proper alignment of the shutter fence 111, including proper dispensing and intake of the shutter fence 111, with the curved slot 191. For example, as shown in FIG. 6, the roller cylinder 180 can be rotated clockwise, from the bottom perspective of FIG. 6, so as to unwrap the shutter fence 111 from the roller cylinder 180. The chamber walls 64 can include a first fence opening 81 for the shutter fence 111 to pass through. The first fence opening can also guide and align the shutter fence 111. The chamber walls 64 can also include a second fence opening 82 for a second shutter fence 211 to pass through. The chamber walls 64 can also include a third fence opening 83 for a third shutter fence 221 to pass through.

The roller cylinder 180, upon which the shutter fence 111 is wrapped, can be enclosed or encased in one or more encasement walls 85. The encasement wall 85 can be provided with an encasement wall opening 86, through which the shutter fence 111 passes. The sidewalls 59 and/or chamber walls 64 of the cutter housing 58 can be provided to enclose or encase the roller cylinder 180. The guide assembly 190 including the slot 191, the fence opening 81, the encasement wall opening 86, and the roller cylinder 180 can be aligned so as to provide effective dispensing and intake of the shutter fence 111.

The guide assembly 190 can include an arrangement of slots 191, 214, 224 that can support the shutter fence 111, as well as the shutter fences 211, 221. As illustrated in FIG. 11, the arrangement of slots can be associated with a plate or plates 194 positioned along the slots 191, 214, 224. The plate 194 can be connected to the top wall 74, of the cutter housing 58, utilizing bolts, tabs, or other mechanical fastener or bearings. The plate 194 can be slender and long in dimension so as to cover along (and align with) the length of the slots of the guide assembly 190. The plate 194 can conceal or protect motion of shutter slats 120 as such shutter slats 120 move along the slots of the guide assembly 190.

The roller cylinder 180 can include a drum 183 upon which are mounted opposing drum flanges 184. The roller cylinder connector 181 can be integrally formed with the drum 183. The roller cylinder connector 181 can be attached to the drum 183 utilizing welding or mechanical fasteners, such as bolts. The size of the drum 183 and drum flanges 184 can be dependent upon the size of the shutter fence 111 and length of the shutter fence 111, i.e. how many shutter slats 120 are provided in the shutter fence 111. In an arrangement with a longer shutter fence 111, the drum flanges 184 can be larger in diameter so as to adequately accommodate and contain the wrapped shutter fence 111.

As shown in FIGS. 5 and 6, for example, the roller cylinder 180 can be supported and driven by driveshaft 185. The driveshaft 185 can be rotatably supported by and pass through the top wall 74 of the cutter housing 58. The top wall 74 can include a bearing housing or bearing so as to support the driveshaft 185. The driveshaft 185 can also be supported by the rotation actuator assembly 186. The rotation actuator assembly 186 can include a pinion gear 189, a gear assembly 188, and a motor 187. The driveshaft 185 can be connected to or integrally formed with the pinion gear 189. The pinion gear 189 can be driven by the gear assembly 188. In turn, the gear assembly 188 can be motorized by the motor 187. The motor 187 can be connected to a controller 198 through control wires 199. The controller 198 can provide power to the motor 187 and/or control the connection of power to the motor 187. The controller 198 can be provided on a control panel of the lawnmower. As a result, the operator of the lawnmower can control rotation of the roller cylinder 180 and whether the shutter fence 111 is wrapped or unwrapped from the roller cylinder 180. For example, from the bottom perspective as shown in FIG. 6, rotation of the roller cylinder 180 counterclockwise, as motorized by the rotation actuator assembly 186, will result in the shutter fence 111 being wrapped upon or taken up by the roller cylinder 180. Rotation of the roller cylinder 180 clockwise will result in the shutter fence 111 being unwrapped or dispensed from the roller cylinder 180.

Figure 14:
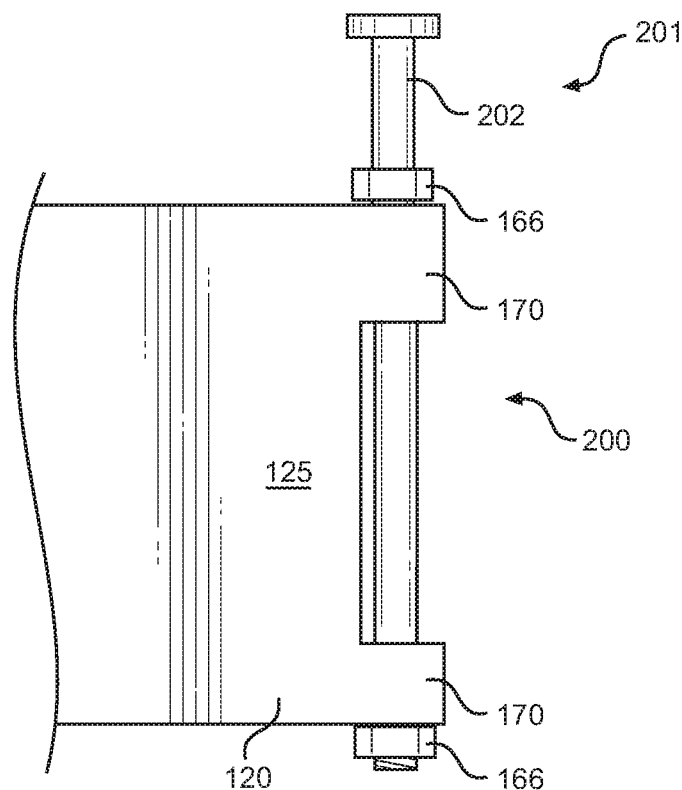
FIG. 14 is a schematic side view of an end portion of a shutter fence in accordance with principles of the disclosed subject matter.

The shutter fence 111 can be dispensed out onto the guide assembly 190 and specifically out into the slot 191. As shown in FIG. 11, slot 191 can be conjoined or connected to other slots 214, 224 for a second shutter assembly 102 and a third shutter assembly 103, respectively. In accordance with an aspect of the disclosure, dispensing of the shutter fence 111 can be assisted or guided by exerting a pulling force on the outer end 113 of the shutter fence 111. Such pulling force can be exerted as the roller cylinder 180 is being rotated so as to dispense the shutter fence 111. Such pulling force may assist in preventing jamming or binding of the shutter fence 111 as the shutter fence 111 is being dispensed or pushed out from the roller cylinder 180. As illustrated in FIG. 14 and in FIG. 15, a pulling force on the outer end 113 of the shutter fence 111 can be assisted utilizing a pull assembly 200.

FIG. 14 shows an illustrative shutter slat 120 that can constitute or be part of an outer end or second end 113 of shutter fence 111. In other words, the shutter slat 120 shown in FIG. 14 can be the last shutter slat 120 in the shutter fence 111. The shutter slat 120, shown in FIG. 14, can include or be connected to a pull rod 201. The pull rod 201 can include an extension portion 202. The pull rod 201 can include lock nuts 166 or other mechanical fastener so as to maintain the pull rod 201 in position upon the shutter slat 120. The extension portion 202 can be provided to extend above the top wall 74 of the cutter housing 58. The extension portion 202 can extend through the slot 191. Accordingly, in operation, a user may grab ahold of the pull rod 201 so as to assist in dispensing of the shutter fence 111 to uncoil from the roller cylinder 180, e.g., to change from the discharge arrangement 105 to the mulch arrangement 106. Such pulling force can assist in preventing jamming or binding of the shutter fence 111 as the shutter fence 111 is being dispensed to the discharge arrangement 105.

Figure 15:
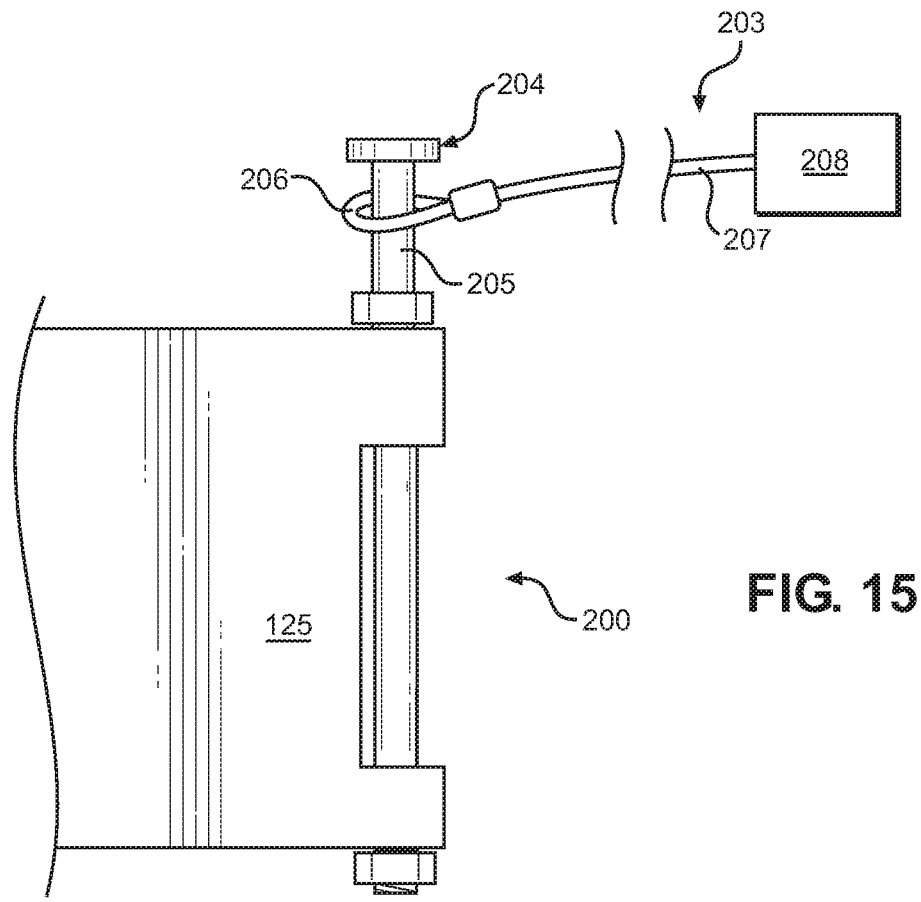
FIG. 15 is a schematic side view of an end portion of a shutter fence with alternative pull assembly, in accordance with principles of the disclosed subject matter.

FIG. 15 shows a further example of a pull assembly 200. FIG. 15 shows an illustrative shutter slat 120 which can constitute or be part of an outer end or second end 113 of shutter fence 111. As an alternative to the arrangement of FIG. 14, the pull assembly 200 of FIG. 15 can include a cable assembly. The arrangement of FIG. 15 can include a pull rod 204 similar in structure to the pull rod 201, but with a shorter extension portion 205. A first end 206 of cable 203 can be attached about the extension portion 205. The cable 203 can be attached at a second end 207 to a pull actuator 208. The pull actuator 208 can be a mechanical device that can (1) intake the cable 203 in conjunction with the shutter fence 111 being unwrapped (for mulch mode), and (2) let out the cable 203 in conjunction with the shutter fence 111 being wrapped upon the roller cylinder 180 (for discharge mode). The length of the cable 203 can be provided to correspond with the length of the shutter fence 111 or the length of the slot 191, for example. The pull actuator 208 can alternatively be a lever arrangement or an elastic element that exerts an outward bias force on the shutter fence 111.

The shutter system 100 can include a second shutter assembly 102 and a third shutter assembly 103. The guide assembly 190 can support the various shutter fences 111, 211, 221.

In general, the second shutter assembly 102 can be of same or similar structure to the first shutter assembly 101. The second shutter assembly 102 can include a second shutter fence 211, a second roller cylinder 212, and a second rotation actuator assembly 213. The second shutter fence 211 (in similar manner as described above with reference to the first shutter fence 111) can be supported in slot 214 and/or slot 191. The second shutter fence 211 can be selectively wrapped (for discharge mode) and unwrapped (for mulch mode to cover, block or partially block second discharge opening 72) from the second roller cylinder 212, through rotation of the second roller cylinder 212. The second roller cylinder 212 can be operatively connected to the second rotation actuator assembly 213, so as to be motorized. The shutter fence 211 can be connected to a pull assembly, similar in structure to the pull assembly 200, so as to assist in pulling out or unwrapping the shutter fence 211 from the second roller cylinder 212. A second encasement wall 87 can be provided to enclose and/or protect the second roller cylinder 212.

In general, the third shutter assembly 103 can be of same or similar structure to the first shutter assembly 101. The third shutter assembly 103 can include a third shutter fence 221, a third roller cylinder 222, and a third rotation actuator assembly 223. The third shutter fence 221 (in similar manner as described above with reference to the first shutter fence 111) can be supported in slot 224 and/or slot 191. The third shutter fence 221 can be selectively wrapped (for discharge mode) and unwrapped (for mulch mode to cover, block or partially block third discharge opening 73) from the third roller cylinder 222, through rotation of the third roller cylinder 222. The third roller cylinder 222 can be operatively connected to the third rotation actuator assembly 223, so as to be motorized. The shutter fence 221 can be connected to a pull assembly, similar in structure to the pull assembly 200, so as to assist in pulling out or unwrapping the shutter fence 221 from the third roller cylinder 222. A third encasement wall 88 can be provided to enclose and/or protect the third roller cylinder 222.

As shown in FIG. 11, the slot 214 can intersect with the slot 191 at an intersection 228. The slot 224 can intersect with the slot 191 at an intersection 229. While the slots 191, 214, 224 are connected, the shutter fences 111, 211, 221 may or may not be overlapped in the guide assembly 190. For example, the first shutter fence 111 may be extended out to—but not beyond—the intersection 228. The shutter fence 211 may be extended out to—but not beyond—the intersection 229. Accordingly, overlap of the shutter fences may be avoided, if desired. However, in other embodiments, there may be overlap of the shutter fences 111, 211, 221 in the guide assembly 190. In particular, there may be overlap in the slot 191 that extends from a near slot end 192 to a far slot end 193. Structure can be provided so as to allow overlap of multiple shutter fences within a single slot. For example, the support slide flange 176, such as shown in FIG. 7, can be provided to only run along a portion or portions of the top edge 143 of the plate member 140. As a result, shutter slats 120 of the first shutter fence 111 can be interleaved or intermixed with shutter slats 120 of the second shutter fence 211. That is, shutter slats 120 of the first shutter fence 111 can be supported by the same slot or portion of slot that serves to support shutter slats of the second shutter fence 211. Shutter slats 120 of the second shutter fence 211 can be supported by the same slot or portion of slot that serves to support shutter slats of the third shutter fence 221.

It is appreciated that the various components of embodiments of the disclosure can be made from any of a variety of materials including, for example, metal, plastic, plastic resin, nylon, composite material, and/or rubber, for example, or any other material as may be desired.

It is appreciated that features described in conjunction with one embodiment can be used in other embodiments as may be desired.

A variety of production techniques can be used to make the apparatuses as described herein. For example, suitable stamping, casting and/or injection molding and other molding techniques, extrusion and other manufacturing techniques might be utilized. Also, metal cutting can be utilized. For example, metal stamping or cutting can be utilized in construction of the cutter deck or the shutter slats 120.

While the subject matter has been described in detail with reference to exemplary embodiments thereof, it will be apparent to one skilled in the art that various changes can be made, and equivalents employed, without departing from the scope of the disclosure.

For example, embodiments are disclosed above in which shutter slat 120 or portions thereof is constructed of a single or unitary piece. However, embodiments are intended to include or otherwise cover a shutter slat 120 that includes or is constructed of multiple pieces. For example, the multiple pieces of shutter slat 120 can be constructed in pieces, such as by a metal stamping process, and then connected together such as by, but not limited to, welding or spot welding, for example. Flexible pieces can be attached to the slats 120 to cover the gaps 179, if desired.

Exemplary embodiments are disclosed above in which the guide assembly 190, including slots 191, 214, 224 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly is intended to be utilized. The guide assembly 190 can also be in the form of a monorail or bearing surface etc. that guides the fences.

Embodiments are disclosed above in which the shutter slat 120 includes a specific shape, geometry, or construction. It is appreciated that shape and structure of shutter slats 120 described herein may vary between different types of lawnmowers and different types of cutter housings and/or dependent on the length of the shutter fence in which the shutter slats will be utilized.

The embodiment of the cutter housing 58 of FIG. 5 shows a symmetrical asynchronous layout for the blades 68, 69, 70 with the center blade offset in a forward direction with respect to the travel direction of the lawnmower 30 and the outboard blades 68, 70 aligned in a transverse direction of the lawnmower 30. However, alternate embodiments can include other asynchronous layouts. For example the center blade 69 can be offset rearwardly with respect to the outboard blades 68, 70. In another exemplary embodiment, the center blade 69 can be offset rearwardly with respect to one of the outboard blades 68, 70, and the other of the outboard blades 68, 70 can be offset rearwardly with respect to each of the center blade 69 and the one of the outboard blades 68, 70.

What is claimed is:

1. A cutter housing assembly for a lawnmower comprising:
    a cutter housing that includes a cutting chamber with a first discharge opening;
    a shutter fence that includes shutter slats, and the shutter slats linked together to form the shutter fence, and the shutter fence including an inner end and an outer end;
    a roller cylinder connected to the inner end of the shutter fence, and rotation of the roller cylinder controllable by a user to select between:
        (a) a discharge arrangement in which the shutter fence is wrapped upon the roller cylinder to provide a first gap associated with the first discharge opening, and
        (b) a mulch arrangement in which the shutter fence is unwrapped from the roller cylinder to provide a decreased gap, relative to the first gap, associated with the first discharge opening;
    a rotation actuator engaged with the roller cylinder and configured to rotate the roller cylinder; and
    a guide assembly engageable with the shutter fence for slidably supporting the shutter fence in the mulch arrangement.

2. The cutter housing assembly of claim 1, wherein the shutter slats, which form the shutter fence, are steel sheets and include:
    an attachment shutter slat attached to the roller cylinder;
    an end shutter slat defining the outer end of the shutter fence; and
    a plurality of extension shutter slats arranged in sequence between the attachment shutter slat and the end shutter slat.

3. The cutter housing assembly of claim 2, wherein each of the attachment shutter slat, the extension shutter slats and the end shutter slat being of same construct.

4. The cutter housing assembly of claim 2, wherein each extension shutter slat includes:
    a plate member that includes a top, a bottom, a first end, and a second end;
    a first knuckle attached to the first end; and
    a second knuckle attached to the second end.

5. The cutter housing assembly of claim 4, wherein each extension shutter slat includes a pin, and the pin extends through the second knuckle.

6. The cutter housing assembly of claim 4, wherein the first knuckle extends from a middle portion of the first end of the plate member, between the top and the bottom, and the first knuckle is attached to an adjacent one of the extension shutter slats.

7. The cutter housing assembly of claim 4, wherein the second knuckle includes,
    a top knuckle portion, extending from an upper height portion of the second end of the plate member, and
    a bottom knuckle portion, extending from a lower height portion of the second end of the plate member,
    the top knuckle portion and bottom knuckle portion are attached to a second adjacent one of the extension shutter slats.

8. The cutter housing assembly of claim 7, wherein the second knuckle includes a bore that receives a pin for connecting to the second adjacent one of the shutter slats.

9. The cutter housing assembly of claim 7, wherein the second adjacent one of the shutter slats includes an adjacent middle knuckle, and the adjacent middle knuckle extends from a central height portion of the second adjacent one of the shutter slats; and
    a pin connects the adjacent middle knuckle to both the top knuckle portion and the bottom knuckle portion, and the pin extends through the top knuckle portion and the bottom knuckle portion.

10. The cutter housing assembly of claim 1, wherein the guide assembly includes a curved slot provided in a top of the cutter housing, and the curved slot is located about the first discharge opening, and the shutter slats are slidably retained in the curved slot by a support flange located at a top portion of the shutter slats.

11. The cutter housing assembly of claim 1, wherein:
    the cutting chamber constitutes a first cutting chamber;
    the discharge opening constitutes a first discharge opening; and
    the shutter fence constitutes a first shutter fence; and
    the cutter housing further includes:
        a second cutting chamber with a second discharge opening; and
    the cutter housing assembly further includes:
        a second shutter fence moveable between a mulch position in which the second shutter fence blocks the second discharge opening and a discharge position in which the second shutter fence is located away from and permits cuttings to flow out of the second discharge opening.

12. The cutter housing assembly of claim 11, further comprising:
    a third cutting chamber with a third discharge opening; and
    a third shutter fence moveable between a mulch position in which the third shutter fence blocks the third discharge opening and a discharge position in which the third shutter fence is located away from and permits cuttings to flow out of the third discharge opening.

13. The cutter housing assembly of claim 2, further including a pull assembly attached to the end shutter slat and configured to pull the shutter fence from the discharge arrangement to the mulch arrangement along the guide assembly.

14. The cutter housing assembly of claim 13, wherein the pull assembly includes, a cable having a first end, which is connected to the end shutter slat, and a second end; and a pull actuator connected to the second end of the cable, the pull actuator including one of (a) an elastic member, and (b) a mechanized coiling member that coils the cable thereupon.

15. The cutter housing assembly of claim 13, wherein the pull assembly includes a pull rod extending above the cutter housing and configured to be engaged by the user.

16. A cutter housing assembly comprising:

a cutter housing that includes a cutting chamber wall with a discharge opening;

a shutter fence that includes a plurality of steel shutter slats, and the shutter slats linked together to form the shutter fence;

a roller cylinder connected to the shutter fence such that rotation of the roller cylinder moves the shutter fence between,
  (a) a discharge arrangement in which the shutter fence is wrapped upon the roller cylinder to provide a first gap associated with the discharge opening, and
  (b) a mulch arrangement in which the shutter fence is unwrapped from the roller cylinder to provide a decreased gap, relative to the first gap, associated with the discharge opening;

an actuator assembly engaged with the roller cylinder and configured to rotate the roller cylinder upon actuation; and a guide assembly configured to support the shutter fence during travel between the discharge arrangement and the mulch arrangement.

17. The cutter housing assembly of claim 16, wherein the guide assembly includes a slot in the cutter housing, and the slot is curved about the cutting chamber wall.

18. The cutter housing assembly of claim 16, wherein:
the cutting chamber wall constitutes a first cutting chamber wall;
the discharge opening constitutes a first discharge opening; and
the shutter fence constitutes a first shutter fence; and
the cutter housing further includes,
  a second cutting chamber wall with a second discharge opening, and
  a third cutting chamber wall with a third discharge opening, and the cutter housing assembly further includes,
  a second shutter fence moveable between a mulch position in which the second shutter fence blocks the second discharge opening and a discharge position in which the second shutter fence is located away from and permits cuttings to flow out of the second discharge opening, and
  a third shutter fence moveable between a mulch position in which the third shutter fence blocks the third discharge opening and a discharge position in which the third shutter fence is located away from and permits cuttings to flow out of the third discharge opening.

19. A lawnmower comprising:
a cutter housing that includes a cutting chamber wall with a discharge opening;
a shutter fence that includes shutter slats, and pins connecting each of the shutter slats to each other to form the shutter fence,
  each shutter slat includes, (a) a plate member that includes a top, a bottom, a first end, and a second end, (b) a first knuckle located at the first end and configured to engage an adjacent shutter slat of the shutter slats, (c) a second knuckle located at the second end configured to engage a further adjacent shutter slat of the shutter slats, and (d) a support slide flange;
an actuator connected to the shutter fence and controllable by a user to selectively move the shutter fence between,
  (a) a discharge arrangement in which the shutter fence is spaced from the discharge opening to form a first gap through which lawnmower cuttings pass during operation of the lawnmower, and
  (b) a mulch arrangement in which the shutter fence blocks the discharge opening such that lawnmower cuttings are mulched during operation of the lawnmower; and
a guide assembly configured to engage the support slide flange to slidably support the shutter fence during travel between the discharge arrangement and mulch arrangement.

20. The lawnmower of claim 19, wherein the actuator includes a roller cylinder about which the shutter fence is spooled when in the discharge arrangement.

* * * * *